United States Patent Office 3,290,113
Patented Dec. 6, 1966

3,290,113
PROCESS FOR THE MANUFACTURE OF ALKALI METAL FLUOBORATES
Simha Harel, Kiryat Motzkin, Georg Stern, Haifa, Zevulun Pessahovitz, Kvutzath Maagan Michael, and Gidon Budman, Kiryat Motzkin, Israel, assignors to Chemical & Phosphates Limited, a company of Israel
No Drawing. Filed Feb. 27, 1963, Ser. No. 261,474
Claims priority, application Israel, May 15, 1962, 17,294
7 Claims. (Cl. 23—59)

Alkali metal fluoborates have known industrial uses, especially in metallurgy, where they are used, for example, as grain refiners in the production of aluminium and magnesium. They are also used for the introduction of boron into alloys.

Alkali metal fluoborates can be produced by the reaction of boric acid with hydrofluoric acid and an alkali metal compound such as a salt or hydroxide. As contrasted to this known method the invention has the object to provide a process in which fluosilicic acid, readily available as an industrial by-product or waste product, can be used as a starting material.

A known method for the preparation of fluoboric acid uses fluosilicic acid and boric acid as starting materials and proceeds according to the equation:

$$2H_2SiF_6 + 3H_3BO_3 = 3HBF_4 + 2SiO_2 + 5H_2O$$

However, the reaction does not proceed to full completion but stops when about 80 to 90 percent of the starting materials have reacted. The silica formed by the reaction precipitates and can be separated from the supernatant liquid which contains fluoboric acid as well as the unreacted balance of fluosilicic and boric acids. The fluorboric acid has to be separated from the reaction mixture, and the unreacted starting materials will have to be utilized, since otherwise the process would be uneconomic. In order to avoid these losses it has already been proposed in U.S. specification No. 2,779,556 to concentrate the reaction mixture whereby further fluoboric acid is produced. This process is inconvenient since the concentrated fluosilicic and fluoboric acids are highly corrosive and for this reason the concentration operation requires special corrosion-resistant equipment.

In the process according to the invention, fluosilicic acid is reacted, in a first stage, with boric acid in aqueous solution and the silica thereby formed is removed; in a second stage sodium fluosilicate is precipitated from the solution separated from the silica and boric acid anion remaining in solution is converted into fluoboric acid anion by fluoride ions in the presence of sodium ions, and the sodium fluosilicate precipitate is separated from the solution; and in a third stage potassium fluoborate is precipitated, or sodium fluoborate recovered by crystallization, from the solution.

If in the third stage, sodium fluoborate is to be recovered, the solution will as a rule have to be concentrated.

In the first stage of this process, free fluosilicic acid and free boric acid may be used as reactants, or one or both of these acids may be supplied to the reaction in the form of compounds capable of liberating the free acid by acidulation with a mineral acid, e.g., hydrochloric or sulfuric acid. Thus, for example, sodium fluosilicate may be used as a source of fluosilicic acid, and borax, a metaborate, e.g., the sodium salt, or a mineral such as colemanite (theoretical formula $$Ca_2B_6O_{11} \cdot 5H_2O)$$

as a source of boric acid.

In the second stage of the process, the presence of both sodium and fluoride ions can be created by the addition of sodium fluoride, or of hydrogen fluoride and a sodium salt other than the fluoride, e.g., the chloride, and preferably the sodium and fluoride ions are supplied in such relative proportions that all the fluosilicic acid is precipitated as sodium fluosilicate and the boric acid anions are quantitatively converted into fluoboric acid anions. This applies in particular to the case that the original reactants are free fluosilicic acid and free boric acid. If sodium fluosilicate is used instead of free fluosilicic acid, and/or sodium metaborate or borax instead of free boric acid, the decomposition of the reactants as well as the reaction between the fluosilicic and boric acid anions caused by the acidulation of the reaction liquid with a mineral acid provide the necessary supply of sodium and fluoride ions.

In the third stage of the process, any suitable potassium salt may be used for the precipitation of fluoborate. For the preparation of sodium fluoborate, sodium hydroxide or carbonate may be used.

If in the first step of the process an excess of boric acid is used, either as the free acid or by liberation from a salt or mineral, this excess can be recovered by the addition of sodium fluoride to the reaction mixture, whereby a further amount of fluoborate is formed.

The process according to the present invention can be expressed by the following equations which are schematic summary representations of the operation and not intended exactly to described the reactions. The equations are drawn up on the assumption that 80 percent of the fluosilicic acid used as starting material is reacted initially. Where the proportion of unreacted statring materials at the end of the first stage is higher or lower than 80%, the balance would accordingly be different. Preliminary tests will easily show how much of the starting materials remains unreacted at the end of the first stage under the particular circumstances of any given raw materials and reaction conditions.

On the assumption that the unreacted part of starting materials amounts to 20% by weight, the first stage of the process can be represented by the equation:

$$10H_2SiF_6 + 15H_3BO_3 = 2H_2SiF_6 \\ + 3H_3BO_3 + 12HBF_4 + 8SiO_2 + 20H_2O \quad (1)$$

The silica formed is removed by filtration, decantation or in any other suitable way.

In the second stage, the remainder of fluosilicic acid is separated by the formation and precipitation of sodium fluosilicate:

$$2H_2SiF_6 + 3H_3BO_3 + 12HBF_4 + 20H_2O + 12NaF \\ = 8NaBF_4 + 7HBF_4 + 2Na_2SiF_6 + 29H_2O \quad (2)$$

The overall reaction can, therefore, be represented by the equation:

$$10H_2SiF_6 + 15H_3BO_3 + 12NaF = 8NaBF_4 \\ + 7HBF_4 + 8SiO_2 + 2Na_2SiF_6 + 29H_2O \quad (3)$$

The virtually insoluble $Na_2SiF_6$ precipitates and is removed. The separated solution contains sodium fluoborate and free fluoboric acid. The latter can equally be converted into the sodium salt, e.g., by the addition of the stoichiometrically required amount of sodium hydroxide or carbonate.

In contrast to the readily water-soluble sodium fluoborate, the corresponding potassium salt is virtually water-insoluble. If it is desired to produce this potassium salt, the solution of sodium fluorborate and fluoboric acid produced by the reaction according to Equation 2 above and freed from the precipitate of sodium fluosilicate is admixed with a potassium salt, e.g., the chloride, in the quantity stoichiometrically required for the conversion of all the fluoboric acid anion present, according to Equation 2, both as free acid and as its sodium salt, into the potassium salt. This latter precipitates virtually quantitatively and can be recovered by filtration. The potassium fluoborate is thus obtained with a high degree of purity even from starting materials contaminated with considerable amounts of impurities.

The invention is illustrated by the following examples to which it is not limited.

*Example 1*

The starting material was an aqueous solution of fluosilicic, hydrochloric and phosphoric acids obtained as a waste liquor in the manufacture of superphosphate.

1.5 liter of this solution, containing 288 gr. of fluosilicic acid, 66 gr. of chloride ion and 30 gr. of $P_2O_5$ were heated to boiling and 185 gr. of solid boric acid were added. About 80% of the fluosilicic acid were decomposed while 56.7 gr. of fluosilicic acid was left unreacted in the solution. The silica formed by the reaction precipitated and was removed by filtration. The filtrate was admixed with 91 gr. of sodium fluoride and the precipitate of sodium fluosilicate thereby formed was filtered off. After washing and drying the precipitate amounted to 74 gr. To the filtrate there was added 245 gr. of potassium chloride, whereby 313 gr. of potassium fluoborate was precipitated. The precipitate was filtered off, washed and dried.

The yield of potassium fluoborate was 83%, calculated on the boric acid used as a starting material.

*Example 2*

1.06 liter of a solution of technical fluosilicic acid containing 144 gr. of fluosilicic acid was admixed with 93 gr. of boric acid. 83 percent of the fluosilicic acid was decomposed while 32 gr. thereof remained in the solution. The precipitate was filtered off and the filtrate admixed with 42 gr. of sodium chloride and 21 gr. of hydrofluoric acid, whereby 32 g. of sodium fluosilicate was precipitated. The precipitate was filtered off and the filtrate, containing dissolved fluoboric acid, was admixed with 124 gr. of potassium chloride whereby potassium fluoborate was precipitated. After washing and drying the precipitate amounted to 170 gr.

The yield of potassium fluoborate was 90%, calculated on the boric acid used as starting material.

*Example 3*

0.67 liter of an aqueous solution of 144 gr. of pure fluosilicic acid was heated to boiling and then admixed with 94 gr. of solid boric acid whereby 87% of the fluosilicic acid was decomposed. The precipitated silica was filtered off and the filtrate admixed with 36 gr. of sodium fluoride whereby 24 gr. of sodium fluosilicate was precipitated. The precipitate was filtered off. The filtrate which contained dissolved fluoboric acid was admixed with 130 gr. of potassium chloride whereby 167 gr. of potassium fluoborate were obtained.

The yield of potassium fluoborate was 88.8%, calculated on the boric acid used as starting material.

*Example 4*

400 ml. of the pure fluosilicic acid solution used in Example 3, containing 86.4 gr. of the acid, were heated to boiling and 200 ml. of a hot aqueous solution of 56.3 gr. of boric acid were added. After the removal of the precipitated silica the filtrate was admixed with 37 gr. of sodium fluoride, whereby 9 gr. of sodium fluosilicate corresponding to 7.2% of the fluosilicate ion originally present in the starting solution was precipitated. The sodium fluosilicate was filtered off, the filtrate was admixed with 5 gr. of sodium carbonate and the solution was concentrated by boiling until the temperature of the boiling solution had risen to 116° C. Then the concentrated solution was cooled. 47 gr. of sodium fluoborate crystallized, being a yield of 48.0%, calculated on the boric acid used as starting material.

The mother liquor separated from the crystallized sodium fluoroborate was recycled to another batch of sodium fluoroborate solution before this was heated in order to be concentrated.

*Example 5*

100 gr. of sodium fluosilicate were slurried in 630 gr. of aqueous hydrochloric acid containing 80 gr. of HCl, the slurry was stirred and heated to and kept at between 90 and 95° C., and at this temperature, 55 gr. of a colemanite mineral containing 45% of $B_2O_3$ was slowly added to the slurry in the course of about 30 minutes in order to supply the amount of 38 gr. of $B_2O_3$ needed for the reaction. While the solid starting materials dissolved some foam was produced which, however, did not interfere with the reaction, and a precipitate of silica was gradually formed. After the complete dissolution of the solid reactants the reaction mixture was stirred for a further 30 minutes at the same temperature. The acid vapours evolved during and after the reaction were collected and the acid was recovered.

The silica precipitate was removed from the hot reaction mixture by filtration and washed on the filter first with hot 3%-by-weight aqueous hydrochloric acid, then with hot water, each in an amount about equal to the volume of the filter cake. The washings were added to the filtrate.

The hot filtrate was admixed with 40 gr. of sodium fluoride which dissolved therein while at the same time a precipitate of sodium fluosilicate formed. When the mixture had cooled down to 60° C. the precipitate of $Na_2SiF_6$ was filtered off. It amounted to about 12 gr. and was added to the starting materials of a next batch operation of the same process. The combined filtrate and washings were admixed with a saturated aqueous potassium chloride solution containing about 85 gr. of KCl, which was an excess by 10 to 20% over the boron-fluorine equivalent of the filtrate, whereby potassium fluoborate, $KBF_4$, was precipitated. This was recovered from the reaction mixture by filtration and washed in the filter with hot water, whereby it was obtained in a completed pure state.

*Example 6*

100 gr. of sodium fluosilicate were slurried with 350 gr. of water and the slurry was admixed with 110 g. of 50%-by-weight aqueous sulfuric acid, the mixture was heated to 85° C. and 65 gr. of boric acid were introduced in the course of 30 minutes into the mixture while the latter was stirred and kept at a temperature of not below 90° C. When all the boric acid had been added the mixture was stirred for about another 30 minutes at about 100° C.

Then the hot mixture was filtered and the filter cake of silica was washed with water in an amount of about 1.5 times the volume of the cake, the washings being united with the filtrate. The filter cake on the one hand, and the combined filtrate and washings on the other hand, were further processed as indicated in Example 5.

We claim:

1. A process for the production of a fluoborate selected from the group consisting of sodium fluoborate and potassium fluoborate which comprises the steps of reacting an aqueous solution obtained by the reaction of a solution of fluosilicic acid with boric acid and separation of the silica formed, with at least the stoichiometric amount of a water-soluble source of sodium ions and the stoichiometric amount of a water-soluble source of fluoride ions, whereby unreacted fluosilicic acid in said aqueous solution is converted to insoluble sodium fluosilicate and unreacted boric acid in said aqueous solution is converted to fluoboric acid, removing said insoluble sodium fluosilicate from the aqueous acidic solution of fluoborate ions, reacting said acidic solution of fluoborate ions with the stoichiometric amount of an alkali metal salt selected from the group consisting of a water-soluble potassium salt and a water-soluble basic sodium salt, and recovering said fluoborate.

2. A process according to claim 1 wherein said alkali metal salt reacted with said acidic solution of fluoborate is the stoichiometric amount of a water-soluble basic sodium salt selected from the group consisting of sodium hydroxide and sodium carbonate and sodium fluoborate is recovered by concentrating the aqueous solution and crystallizing said sodium fluoborate.

3. A process according to claim 1 wherein said alkali metal salt reacted with said acidic solution of fluoborate is the stoichiometric amount of a water-soluble potassium salt and insoluble potassium fluoborate is recovered.

4. A process according to claim 3 wherein said water-soluble potassium salt is potassium chloride.

5. A process according to claim 1, wherein sodium fluoride is used as a compound supplying both sodium and fluoride ions.

6. A process according to claim 1, wherein hydrogen fluoride and a sodium salt other than the fluoride are used as sources of fluoride and sodium ions.

7. A process according to claim 6, wherein sodium chloride is used as the sodium salt.

References Cited by the Examiner
UNITED STATES PATENTS 2,799,556  7/1957  Sullivan et al. _____ 23—59
3,178,261  4/1965  Lewis et al. _____ 23—59

OTHER REFERENCES

Mathers et al., Proc. of the Indiana Academy of Science, vol. 59, 1950, pages 144–146.

MILTON WEISSMAN, *Primary Examiner.*

OSCAR R. VERTIZ, *Examiner.*

H. T. CARTER, *Assistant Examiner.*